Jan. 13, 1970
A. D. ROBINSON  3,489,903
RADIOACTIVITY MEASUREMENT INCORPORATING SAMPLE VAPORIZATION AND ELECTRIC CHARGE COLLECTION
Filed Jan. 3, 1966
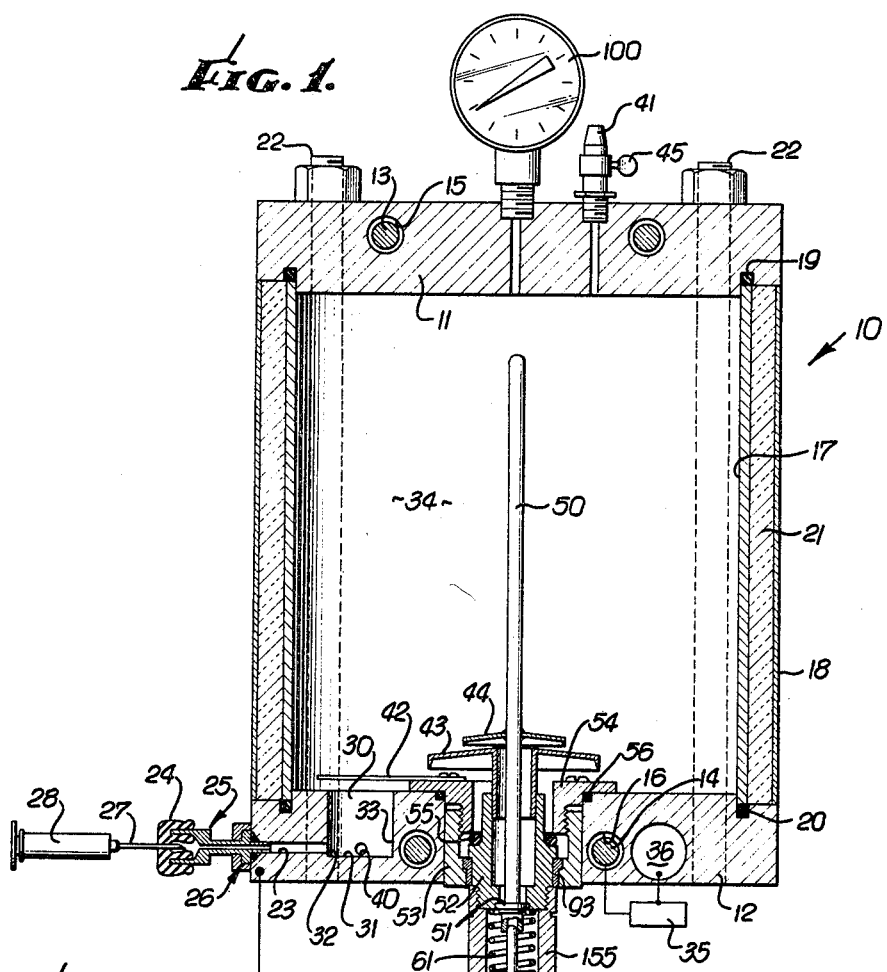
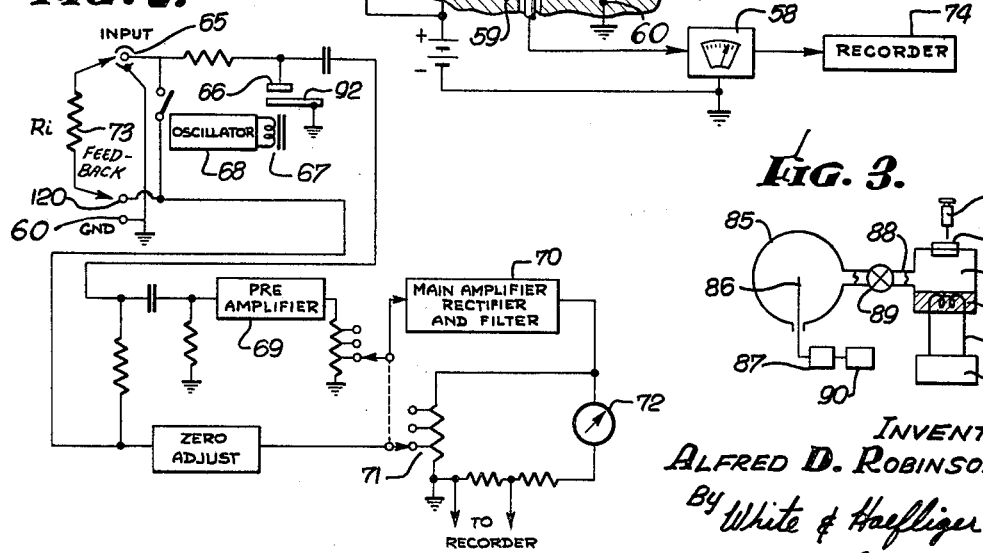
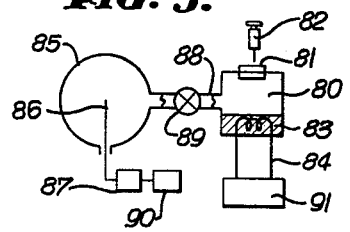
INVENTOR.
ALFRED D. ROBINSON
BY White & Haefliger
ATTORNEYS.

United States Patent Office 3,489,903
Patented Jan. 13, 1970

3,489,903
RADIOACTIVITY MEASUREMENT INCORPORATING SAMPLE VAPORIZATION AND ELECTRIC CHARGE COLLECTION
Alfred D. Robinson, El Monte, Calif., assignor, by mesne assignments, to Cary Instruments, Monrovia, Calif., a corporation of California
Filed Jan. 3, 1966, Ser. No. 518,117
Int. Cl. G01t 1/18; H01j 39/28
U.S. Cl. 250—83.6        10 Claims

ABSTRACT OF THE DISCLOSURE

The disclosure concerns apparatus and method for effecting rapid measurement of radioactivity in a liquid sample of predetermined volume by subjecting the sample to vaporization in a confined zone and collecting electrical charge produced in that done as a result of the vaporization.

This invention relates generally to determination of radioactivity, and more specifically concerns unusually advantageous apparatus and method for effecting rapid measurement of radioactivity in liquid samples subject to vaporization. Such samples may, but do not necessarily, consist of tritium contaminated urine.

For safety and other reasons, there is a continuing need to monitor tritium contamination of individuals exposed to radioactivity. Inasmuch as a rapid exchange takes place as between tritium and hydrogen in the body fluids, a sample of urine represents the whole body contamination, and accordingly many attempts have been made in the past to achieve satisfactory methods and apparatus for determining tritium contamination of urine.

The usual methods have required preparation of the sample either by distillation for scintillation counting, or by decomposition of water to hydrogen by addition of alkali metal, or by electrolysis, for ion chamber methods of determination. Such prior methods have required such considerable apparatus and excessive time for tritium determination, or in some cases are so inaccurate, as to be considered disadvantageous. Also, systems requiring an equilibrium between the sample and a flowing carrier gas are objectionable in view of their sensitivity to temperature, pressure and flow.

Basically, the present invention has as its major objects the provision of method and apparatus overcoming the objections to and disadvantages of prior processes and equipment. Basically, the invention resides in the concept of rapidly vaporizing a known weight or volume of sample in a confined zone such as an ion chamber, and collecting electrical charge produced in that zone. Typically, the rapid evaporation is effected by transferring heat into the sample from a heated surface in contact with the sample upon introduction of the latter into the confined zone. Under these conditions, accurate measurement of radioactivity becomes a function only of the weight or volume of the sample introduced and is not dependent upon the volume of the confined zone or ion chamber, or upon the temperature or pressure in the chamber. Typically, the sample may consist of tritium-containing urine, the physiological maximum acceptable tolerance being about 50 microcuries of tritium per liter of urine.

Additional method steps include maintenance of the confined zone interior at above a temperature at which all the sample will be vaporized, say for example about 100 degrees centigrade during the urine vaporization; introducing flush gas into the zone prior to the sample introduction step; detecting the collected charge as by means of an electrometer; and controlling the displacement of vaporized sample from the vaporization zone into another zone charge collection.

In its structural aspects, the apparatus basically comprises means including closed chamber structure having an inlet through which a radioactive liquid sample may be introduced into the chamber interior, said means having a heated surface for effecting vaporization of the sample coming in heat transfer proximity thereto, and electrical charge collecting means disposed to collect electrical charge produced in the interior of the chamber structure. Typically, the heated surface is presented to contact the sample and is located in the lower interior of the chamber, a metal plate providing that surface and being sized to store sufficient heat to rapidly vaporize a predetermined volume of liquid sample. The charge collecting means may comprise an electrometer having an electrode projecting in the chamber interior, and the chamber structure may include a single zone into which the electrode projects and in which the sample vaporizes, or the sample may vaporize into a first zone separate from a second zone into which the electrode projects. In the latter case, closure means may be used to controllably block and unblock intercommunication of the zones.

Additional features and advantages of the invention include the provision of a self-sealing elastomer barrier sealing the chamber inlet and exposed to receive penetration of a tube through which the sample may be introduced into the chamber; the provision for syringe introduction of the sample into the chamber through the self-sealing barrier; and the provision of valve controlled flush porting for passing chamber flushing gas.

These and other objects and advantages of the invention, as well as the details of illustrative embodiments, will be more fully understood from the following detailed description of the drawings, in which:

FIG. 1 is a vertical section showing one preferred form of the apparatus of the invention;

FIG. 2 shows an electrometer circuit usable in the FIG. 1 apparatus; and

FIG. 3 shows schematically the provision of separate chambers, one for sample vaporization and another for charge collection.

Referring first to FIG. 1, a closed ionization chamber is seen at 10, including top and bottom metal plates 11 and 12 suitably heated as by means of cartridge heaters 13 and 14 extending within passages 15 and 16 therein. The chamber also has inner and outer cylindrical shells 17 and 18, extending between the plates, and sealed at 19 and 20 to form a pressure tight construction. Insulation 21 is provided in the space between the shells, and the assembly may be held together as by easily removable fasteners, indicated at 22, enabling ready disassembly for cleaning and removal of urine salts. A pressure gauge 100 may be used, if desired.

The chamber has an inlet 23 through which a radioactive liquid sample may be introduced into the chamber interior for rapid vaporization therein. Typically, the assembly includes a self sealing elastomer barrier sealing the inlet, as for example is provided by the rubber stopper 24 carried by the tubular fitting 25 having sealed attachment at 26 to the plate 12. Barrier 24 is exposed to receive penetration of a tube 27 through which a metered quantity of sample may be introduced into the chamber. Typically, a sample metering syringe 28 may be used, the syringe including the tube in the form of a needle penetrating the barrier. A typical barrier 24 would consist of a serum bottle cap made of soft rubber.

Liquid sample introduced via inlet 23 is received in the well 30 formed in the lower plate 12, where the sample comes into contact with the heated surfaces 31–33 of that plate. Sufficient heat is stored in the plate to effect rapid vaporization of the sample, the vapor rising into the interior 34 of the closed chamber 10. A source of electrical current for the heaters 14 and 15 is schematically indicated at 35 and as controlled by a thermostat 36 contained in the plate 12 for intimate heat transfer therewith, whereby the plate temperature may be closely controlled. In the case where the samples consist of tritium-containing urine, the temperature of plate 12 should be such as to maintain the chamber interior about 100 degrees C.

Before introducing a sample of liquid into the chamber well 30, flush gas is passed into and through the chamber, as via inlet 40 and outlet 41, these being valve controlled as at 45. The flush gas should have a characteristic low background alpha radiation count, to reduce alpha ionization current masking of the desired radiation determination. Typical flush gases are represented by hydrogen, argon, oxygen and nitrogen.

The sample introduced into well 30 may tend to spatter during its rapid evaporation, resulting in incomplete vaporization. Such spattering of the sample from well 30 may be reduced as by shielding indicated at 42, 43 and 44 and suitably mounted on the illustrated components, to be described.

The apparatus also includes electrical charge collecting means disposed to collect electrical charge produced in the interior of the closed chamber structure. In this regard, ionizing radiation in a gas produces mostly electrons and positively charged molecules. Except in certain very pure gases, the electrons quickly attach to other gas molecules giving them a negative charge. In the presence of an electrostatic field, the charged particles collect on the cathode and anode of the ionization chamber. Typically, as in FIG. 1, the chamber is made the anode, and the cathode is provided by an electrode in the form of a probe 50 projecting in the chamber interior. However, the reverse polarity is equally satisfactory in some cases, depending on the flush gas used and on the liquid medium under analysis.

The metallic probe 50 is mounted by the insulator 51, which may typically consist of a sapphire annulus, also serving to electrically insulate the probe 50 from guard ring 52. Mounting ring 53 supports another ring 54, which retains annular seals 55 and 56 providing pressure sealing between guard ring 52 and plate 12. Guard ring 52, grounded and insulated by Bakelite spacer 93 and seal 55 from rings 53 and 54 carried by plate 12, maintains the voltage across input insulator 51 at a very low level; this minimizes leakage of charge across insulator 51; such leakage of charge would constitute direct error in the radioactivity measurement. An insulator annulus 155, as for example Micarta, is suspended from ring 52 to thermally insulate the chamber from the support 57, which may comprise part of the electrometer indicated schematically at 58. The probe 50 is electrically connected with the electrometer input via lead 59, and the guard ring has electrical connection with the electrometer ground or common terminal 60 via spring 61 and support 57. D.C. current to be measured increases in proportion to the number of electrons collected by the probe, which is proportional to the amount of radioactivity in the chamber.

FIG. 2 shows one form of electrometer circuit that may be used with the FIG. 1 chamber, and it is known as the Cary Model 31 Vibrating Reed Electrometer, a product of Applied Physics Corp. of Monrovia, Calif. In the circuit, the charge to be measured, applied at probe 65, produces D.C. voltage across the vibrating reed capacitor 66. The electromagnet 67 and oscillator 68 cause the reed 92 to vibrate at a predetermined frequency, which varies the capacity of capacitor 66 at that frequency, producing an AC voltage across the capacitor proportional to the impressed DC signal. This AC voltage is amplified at 69 and 70 and also rectified and filtered at 70 in a synchronous rectifier. The rectified and filtered output causes current proportional to the DC input to flow through the inverse feedback resistors 71 and the meter circuit 72. In this way, currents smaller than $10^{-15}$ amperes may be measured by the so-called rate-of-charge method. Currents from about $10^{-15}$ amperes to $10^{-6}$ amperes may be measured by employing a calibrated high value resistor at 73, between "feedback" terminal 120 and "input" terminal 65. A recorder is seen at 74 in FIG. 1 as having input connection to the electrometer output; a satisfactory arrangement for making this connection is indicated more specifically in FIG. 2.

In operation, the chamber 10 is allowed to reach its operating temperature as indicated by opening of the thermostat contacts. The chamber is flushed with low alpha count gas, and the flush valves closed. The electrometer is set at some convenient scale reading, and the radioactive liquid sample is introduced into the chamber. The sample immediately begins to evaporate and the pressure in the chamber increases correspondingly. Within a few minutes, for example 4–6 minutes in the case of tritium contaminated urine, the electrometer scale reading indicates an accurate measurement of beta decay due to the tritium in the sample.

In FIG. 3, the closed chamber structure includes a first zone 80 into which the sample vaporizes after introduction through sealed inlet 81 as by syringe 82. A heated plate and heater appear at 83 and 84. The chamber structure also includes a second zone 85 into which the probe 86 of electrometer 87 projects. Means is provided to controllably block and unblock intercommunication of the zones 80 and 85, so that exposure of the probe to the vapor may be delayed until partial or complete vaporization of the sample has occurred in zone 80. One such means may take the form of the duct 88 and control valve 89 in series therewith, the duct communicating between the chamber zones. A recorder and a heater current source are respectively indicated at 90 and 91.

Sample-handling efficiency may be further increased by utilizing a plurality of assemblies 80, 81, 83, 84, 88, 89 and 91, in common with a single charge-collecting chamber 85, electrometer probe 86, electrometer 87 and recorder 90.

I claim:

1. In radioactivity measurement apparatus, means including closed chamber structure having an inlet through which a radioactive liquid sample of predetermined volume may be introduced into the chamber hollow interior, a surface exposed to the chamber interior and heated to a sufficiently high temperature for effecting vaporization of the liquid sample coming in heat transfer proximity thereto, and electrical charge collecting means including an electrode disposed to collect electrical charge produced in the hollow interior of said structure in response to the presence of said vaporized liquid sample, said electrode being exposed to the hollow interior of said chamber structure.

2. The apparatus of claim 1 including such sample in the form of tritiated aqueous fluid within the chamber interior.

3. The apparatus of claim 1, in which said first named means includes a self sealing elastomer barrier sealing said inlet and exposed to receive penetration of a tube through which the sample may be introduced into the chamber.

4. The apparatus of claim 3 including a sample metering syringe, said tube being in the form of a syringe needle penetrating said barrier.

5. The apparatus of claim 1, in which said heated surface is presented to contact the sample and is located in the lower interior of said chamber.

6. The apparatus of claim 5, in which said heated surface is defined by a metal plate sized to store sufficient heat to rapidly vaporize a predetermine volume of sample liquid.

7. The apparatus of claim 1, in which said charge collecting means also comprises an electrometer having electrical connection to said electrode.

8. The apparatus of claim 7, in which said chamber structure includes a single zone into which said electrode projects and in which the sample vaporizes.

9. The combination of claim 1, in which said chamber structure includes a first zone into which the sample vaporizes and a second zone containing said collecting means, and including means located to controllably block and unblock intercommunication of said zones.

10. The apparatus of claim 1, in which the chamber has valve controlled flush porting for passing chamber flushing gas.

References Cited

UNITED STATES PATENTS 2,892,086   6/1959   Carter.

OTHER REFERENCES

Christman: "Measuring Radioisotopes in Organic Compounds," Nucleonics, vol. 23, No. 12, December 1965, pp. 39–45.

Okita et al.: "Liquid-Scintillation Counting for Assay of Tritium in Urine," Nucleonics, March 1956, pp. 76–78, vol. 14, No. 3.

Robinson, C. V.: "A Methane, Proportional Counting Method for the Assay of Tritium," Review of Scientific Instruments, vol. 22, No. 6, June 1951, pp. 353–356.

Wilzbach et al.: "The Preparation of Gas for Assay of Tritium in Organic Compounds," Science, vol. 118, 1953, pp. 522–523.

RALPH G. NILSON, Primary Examiner

A. B. CROFT, Assistant Examiner

U.S. Cl. X.R.

128—1.1; 250—43.5, 106